United States Patent
Peretti

(10) Patent No.: US 12,044,620 B2
(45) Date of Patent: Jul. 23, 2024

(54) SUPER RESOLUTION TIME DOMAIN SPECTROSCOPY METHOD AND DEVICE FOR SAMPLE CHARACTERIZATION

(71) Applicants: CENTRE NATIONAL DE LA RECHERCHE SCIENTIFIQUE, Paris (FR); Centrale Lille Institut, Villeneuve d'Ascq (FR); Université de Lille, Lille (FR); UNIVERSITE POLYTECHNIQUE HAUTS-DE-FRANCE, Valenciennes (FR); JUNIA, Lille (FR)

(72) Inventor: Romain Peretti, Villeneuve d'Ascq (FR)

(73) Assignees: CENTRE NATIONAL DE LA RECHERCHE SCIENTIFIQUE, Paris (FR); CENTRALE LILLE INSTITUT, Villeneuve D'Ascq (FR); UNIVERSITE DE LILLE, Lille (FR); UNIVERSITE POLYTECHNIQUE HAUTE-DE-FRANCE, Valenciennes (FR); JUNIA, Lille (FR)

( * ) Notice: Subject to any disclaimer, the term of this patent is extended or adjusted under 35 U.S.C. 154(b) by 78 days.

(21) Appl. No.: 17/797,733

(22) PCT Filed: Feb. 11, 2021

(86) PCT No.: PCT/EP2021/053298
§ 371 (c)(1),
(2) Date: Aug. 5, 2022

(87) PCT Pub. No.: WO2021/160725
PCT Pub. Date: Aug. 19, 2021

(65) Prior Publication Data
US 2023/0112535 A1    Apr. 13, 2023

(30) Foreign Application Priority Data

Feb. 11, 2020    (EP) .................................. 20305128

(51) Int. Cl.
G01N 21/3586    (2014.01)
G01N 21/3504    (2014.01)
G01N 21/35      (2014.01)

(52) U.S. Cl.
CPC ..... *G01N 21/3586* (2013.01); *G01N 21/3504* (2013.01); *G01N 2021/3595* (2013.01)

(58) Field of Classification Search
CPC ........... G01N 21/3586; G01N 21/3504; G01N 2021/3595
See application file for complete search history.

(56) References Cited

U.S. PATENT DOCUMENTS

2001/0019409 A1*  9/2001  French ............... G01N 21/6408
                                                    356/317
2017/0307520 A1  10/2017  Hepp et al.

OTHER PUBLICATIONS

Peretti, et al., "THz-TDS time-trace analysis for the extraction of material and metamaterial parameters", IEEE transactions on Terahertz science and technology, vol. 9, No. 2, pp. 136-149, Mar. 2019.
(Continued)

*Primary Examiner* — David P Porta
*Assistant Examiner* — Fani Polyzos Boosalis
(74) *Attorney, Agent, or Firm* — BakerHostetler

(57) ABSTRACT

A method for determining a set of physical parameters of a sample, comprising the steps of: —A Retrieving a measured sample temporal trace Es(t), —B retrieving a measured reference temporal trace Eref(t), —C determining an widened reference temporal trace, called Eref0(t), and determining a discrete Fourier transform $\check{E}_{ref0}(\omega)$ of the widened reference temporal trace—D determining a modeling of an impulse response of the sample in the frequency domain,
(Continued)

depending on the set of physical parameters (pi), called sample frequency model $\check{E}_{model}\{Pi\}(\omega)$, from the Fourier Transform of the widened reference temporal trace $\check{E}_{ref0}(\omega)$ and a physical behavior model of the sample, —E applying an optimization algorithm on the set of physical parameters (pi) comprising the sub steps of: —E1 initializing physical parameters (pi), —realizing iteratively the sub steps of: —E2 calculating an inverse discrete Fourier transform of the sample frequency model $\check{E}_{model}\{Pi\}(\omega)$, called estimated sample temporal trace $E_{est}\{Pi\}(t)$, —E3 calculating an error function ($\varepsilon_{er}\{pi\}$), until obtaining a set of values ($pi_{opt}$) of physical parameters minimizing said error function.

11 Claims, 15 Drawing Sheets

(56) References Cited

OTHER PUBLICATIONS

Katagiri, et al., "Time-domain terahertz gas spectroscopy using hollow-optical-fiber gas cell", Optical Engineering, vol. 57, No. 5, 2018.
Withayachumnankul, et al., "Fundamentals of Measurement in Terahertz Time-Domain Spectroscopy", Journal of Infrared, Millimeter, and Terahertz Waves, vol. 35, No. 8, pp. 610-637, 2014.
Sitnikov, et al., "Open-path gas detection using terahertz time-domain spectroscopy", J. Phys.: Conference Series, vol. 1147, p. 012061, 2019.
Xu, et al., "Limit of Spectral Resolution in Terahertz Time-Domain Spectroscopy", Chinese Physics Letters, vol. 20, No. 8, 2003.

* cited by examiner

US 12,044,620 B2

SUPER RESOLUTION TIME DOMAIN SPECTROSCOPY METHOD AND DEVICE FOR SAMPLE CHARACTERIZATION

CROSS-REFERENCE TO RELATED APPLICATIONS

This application is a National Stage of International patent application PCT/EP2021/053298, filed on Feb. 11, 2021, which claims priority to foreign European patent application No. EP 20305128.9, filed on Feb. 11, 2020, the disclosures of which are incorporated by reference in their entirety.

BACKGROUND

Field

The invention relates in general to a method for determination of physical parameters of a sample by Time Domain Spectroscopy (TDS). In particular the invention relates to a method for fitting the measured temporal trace of the sample and thus to extract the physical parameters.

RELATED ART

The method of time domain spectroscopy is a well-established technique performed today in the Terahertz time domain (THz-TDS), that is to say by using excitation beams with frequencies between 0.1 THz to 30 THz. THz-TDS has shown the capability to study different materials such as semiconductors, ferroelectrics, superconductors, liquids, gases, biomolecules, molecular crystal such as carbohydrates, band-pass filter, metasurfaces embedded in microfluidic circuitry . . . .

In contrast to Fourier-transform infrared spectrometers where the measured function is the autocorrelation of the time-domain data through interferometry, THz-TDS is based on a direct measurement of the electric field in the THz frequency range.

The working principle of a common THz-TDS setup is depicted in FIG. 1. A THz excitation beam EB is emitted by a photoconductive THz antenna or a nonlinear crystal NL by means of the optical rectification effect of a near-infrared pulse produced by a femtosecond laser L (shown on FIG. 1). The excitation beam EB is shown on FIG. 2. It consists of periodically emitted electromagnetic/light pulses 20 with a period T (left side), having a spectrum 21 consisting in a frequency comb (right side). Both periodicities are important for the implementation of the TDS method.

Today the electromagnetic (THz) pulse can be obtained by optical rectification of a femtosecond laser pulse or by a photoconductive THz antenna illuminated by a femtosecond laser pulse.

To be in the THz range, the pulse should last from several hundreds of femtoseconds to few picoseconds. The repetition rate frep (equal to 1/T) of the laser may vary from GHz to sub Hz rate.

Next, a lens or a parabolic mirror is used to collimate the pulse beam and to direct it toward the sample S under study. The transmitted (or reflected) pulse emerging from the sample is then collected by an optical system and aligned onto a detector D. The detector measures the electric field of an electromagnetic wave as a function of time, on scales ranging from femto second to several hundred picoseconds or even nanoseconds. This may be done by means of photoconductive or electro-optical sampling. The time sampling is performed typically by coherent detection, by using a delay line DL made of mirrors mounted on a motorized translation stage, as shown on FIG. 3, introducing a retardation $\Delta t$ having a maximal time excursion tmax. The time sampling can also be performed via the beating of two frequency combs whose repetition rate is slightly different (technique called HASSOPS). Time interval between two measurements is called sampling period ts, with frequency sampling fs=1/ts. In the following we will call tmax the time range on which the measurement of the electric field is realized, called temporal trace.

A typical sampling period ts is between 10 and 50 fs. The ability to measure directly the electric field of the THz pulse rather than the averaged energy gives access to both the phase and the amplitude of the waveform, and thus provides information on the absorption coefficient and the refractive index of the sample. We call the measured sample temporal trace Es(t) and the measured reference temporal trace without the sample Eref(t).

For material analysis, the usual way to retrieve material parameters is to perform a Fourier transform of the recorded pulse time-traces Es(t) and Eref(t) (with and without a sample). In the linear approximation the ratio between these two spectra is called the complex transmission coefficient and can be written as:

$$\tilde{T}(\omega) = \frac{\tilde{E}_s(\omega)}{\tilde{E}_{ref}(\omega)}, \quad (1)$$

$$\tilde{T}(\omega) = \tilde{s}(\omega) \times \exp\left(-j\frac{\omega d}{c}(\tilde{n}(\omega)-1)\right) \times \tilde{FP}(\omega)$$

$\tilde{E}_s(\omega)$ and $\tilde{E}_{ref}(\omega)$ are the Fourier transforms of time-domain signals $\tilde{E}_s(t)$ and $\tilde{E}_{ref}(t)$, respectively, $\tilde{n}(\omega)$ is the complex refractive index where the real part corresponds to a delay and the imaginary part to an absorption in the material, d is the thickness of the sample that must be measured, and $\omega$ is the angular frequency, linked to the frequency by the formula $\omega=2\pi f$. The term $\tilde{S}(\omega)$ is the product of the Fresnel coefficients at normal incidence for the two air/material interfaces and $\tilde{FP}(\omega)$ is a term taking into account the Fabry-Pérot multiple reflections in the sample.

Equation (1) sets the so-called "forward problem": knowing $\tilde{E}_{ref}(\omega)$ and $\tilde{n}(\omega)$ one can obtain $\tilde{E}_s(\omega)$. Since the experiment gives $\tilde{E}_{ref}(\omega)$ and $\tilde{E}_s(\omega)$, the actual interest is the "inverse problem", that is, with knowledge of $\tilde{E}_{ref}(\omega)$ and $\tilde{E}_s(\omega)$, one can determine $\tilde{n}(\omega)=\tilde{\eta}(\omega)+i\tilde{k}(\omega)$.

Generally, a first method 10 for determining physical parameters of interest of the sample has the principle steps of:
  performing the experiments with and without sample, that is to say measuring Es(t) and Eref(t) (an example is given on FIG. 4 for lactose, with area 5 corresponding to an oscillation following a damped sinus),
  computing the Discrete Fourier Transform on a time window equal to tmax (where the measurements exists) of both temporal traces, $\tilde{E}_{ref}(\omega)$ and $\tilde{E}_s(\omega)$ (see FIG. 5 based on signal of FIG. 4, pic 6 corresponding to the main component of the Fourier transform of the damped sinus 5), and determining the measured transfer function $\tilde{T}_{meas}$,
  measuring the thickness of the sample;
  extracting the real and/or imaginary part of the refractive index $\tilde{\eta}(\omega)$, $\tilde{k}(\omega)$ by minimizing an error function (using a minimization algorithm such as gradient free or quasi-Newton), the error function being defined from δp, the modulus error, and δφ, the phase error between the modeled transmission coefficient T̃ and the measured one T̃$_{meas}$ the extraction being made for every single frequency (see FIG. 6 for lactose, with d=900 μm±20 μm);

fitting the refractive index to obtain the material parameters, with the assumption that the refractive index follows a model such as the Drude-Lorentz model. The material parameters are typically intensity and resonance frequencies, and/or line width, of the spectral lines (see below).

Regarding step ii), the Discrete Fourier Transforms (DFT) is a mathematical tool for determining the Fourier transform of a periodic discrete function. The calculation of the DFT is most often performed by a FFT algorithm (Fast Fourier Transform).

The electromagnetic pulse interacting with the sample undergoes a retardation related to the real part η(ω) of refractive index of the sample and an absorption related to the imaginary part k̄(ω) of the refractive index. The retardation R of FIG. 4 is the time delay related to η(ω), oscillations 5 of FIG. 4 illustrate the wave point of view of the absorption of the sample and peaks 6 are the absorption peaks in the frequency domain, related to k̄(ω).

Regarding step (v), the Drude Lorentz model is based on the assumption that in the sample, the light interacts with electrons in a decreasing harmonic oscillator. His motion equation can be written by a sinus damped by an exponential in the time domain (see are 5 in FIG. 4), corresponding to a Lorentz curve in the frequency domain. The absorption spectral lines thus follow a Lorentz curve illustrated in FIG. 7. This model is particularly used in gas spectroscopy, as soon as the pressure is greater than few tens of micro bar.

Each spectral line following a Lorentz curve is characterized by 3 parameters: a maximum M; a line width γ, a resonant frequency f0 corresponding respectively to the physical parameters p1, p2 and p3 (i=1 to 3 in this case).

This first method has shown promising results, but has several drawbacks:

First, it needs a precise measurement of the sample thickness. Second, the result does not respect causality (which takes the form of the Kramers-Kroenig relations in this problem) and consequently may lead to false results.

To overcome some of the drawbacks of the above described method, the publication "THz-TDS time-trace analysis for the extraction of material and metamaterial parameters" form Peretti et all, IEEE transactions on Terahertz science and technology, vol. 9, no 2, March 2019", that will be called the Peretti publication, describes a second method based on a comparison of the initial time-domain data of the measured THz pulse. A theoretical way to implement such method would be:

(i) Retrieving measured sample temporal trace Es(t) and measured reference temporal trace Eref(t), on a time duration tmax, (ii) Determining a model $E_{model}\{pi\}(t)$ depending on the set of parameters {pi} depicting how the sample transforms the reference pulse into the modeled one, (iii) Determining an objective function Obj{pi} to minimize, equal to the $L^2$ norm (square root of the sum of the square of the differences) of the difference between the modeled pulse and the measured (sample) one:

$$Obj\{p_i\} = \sum_{t=0}^{t=t_{max}} (E_{model}\{p_i\}(t) - E_s(t))^2 \quad (2)$$

(iv) Determining a set of values of parameters pi minimizing the object function.

This method does not need the knowledge of the thickness d of the sample and respects causality, because the thickness comes as a parameter and because the error computation is in the time domain.

Unfortunately the modeling describing how the sample transforms the reference pulse into the modeled one is unknown in the time domain. All the known models describe the sample behavior in the frequency domain: $Ẽ_{model}\{pi\}(\omega)$.

But a practical advantage of the formulation of equation (2) is given by Parseval's theorem, which states that the norm of a function is the same as the norm of its Fourier transform, meaning that the object function Obj{pi} can be calculated by using the formula:

$$Obj\{p_i\} = \sum_{\omega=-\omega_{min}}^{\omega=-\omega_{max}} |Ẽ_{model}\{p_i\}(\omega) - Ẽ_s(\omega)|^2 \quad (3)$$

with:

$\omega_{max}=\pi/dt$, with dt corresponding the sampling period is $\omega_{min}=\pi/dt$ Thus in formula (3) the object function is expressed as a function of the difference between the modeling of the sample behavior in the frequency domain and the Discrete Fourier Transform of the measured sample temporal trace Es(t).

This is extremely convenient, allowing the calculation of the objective function in both time and frequency domains. This method can thus be implemented directly in the frequency domain, avoiding the calculation of a Fourier transform at each iteration.

By using a DFT, the two methods described above assume that their data are periodic with a period corresponding to the time length of the recording. Consequently they assume that the time distance T between two pulses is exactly equal to the maximal excursion of the delay line tmax, which is generally false.

The second method 20 described in the Peretti publication, implemented in the frequency domain but corresponding to a fit in the temporal domain, is illustrated in FIG. 8 and comprises the following steps:

Step A0: Retrieving measured sample temporal trace Es(t);

Step B0: Retrieving measured reference temporal trace Eref(t),

Step C0: Determining the discrete Fourier transforms of Es(t), $Ẽ_s(\omega)$, on a time window equal to tmax, Step C0': Determining the discrete Fourier transforms of Eref(t), $Ẽ_{ref}(\omega)$, on a time window equal to tmax.

Those steps are identical to steps (i) and (ii) of the first method 10.

Step D0: determining a sample frequency model $Ẽ_{model}\{pi\}(\omega)$ from and a physical behavior model of the sample, depending on the set of physical (predetermined) parameters pi. This model performs the modeling of an impulse response of the sample in the frequency domain.

Typically the model $Ẽ_{model}\{pi\}(\omega)$ consists in multiplying the Fourier transform of the reference temporal trace $Ẽ_{ref}(\omega)$ by a transfer function T̃(ω) related to the complex refractive index by formula (1).

$$Ẽ_{model}\{pi\}(\omega) = Ẽ_{ref}(\omega) \times T̃(\omega) \quad (4)$$

Step E0: applying an optimization algorithm on the set of physical parameters pi comprising the steps of:

E1 initializing physical parameters then realizing iteratively the step E2 of determining an object function Obj{pi} from the difference between the discrete Fourier transform of measured sample temporal trace $\tilde{E}_s(\omega)$ and the sample frequency model $\tilde{E}_{model}\{pi\}(\omega)$, until obtaining values of parameters pi minimizing said object function. For example iterating until the object function becomes less than a predetermined threshold.

For example, the object function is determined from the square of the difference as follows (least square algorithm)

$$Obj\{p_i\} = \sum_{\omega=-\omega_{min}}^{\omega=-\omega_{max}} |\tilde{E}_{model}\{p_i\}(\omega) - \tilde{E}_s(\omega)|^2 \quad (5)$$

The method performs the calculation in few steps, realizing a fit in the temporal domain, but using a simple calculation in the frequency domain.

For bulk solid materials, the Peretti publication implements the multiple Drude Lorentz model which defines the dielectric permittivity of a sample as a set of electronic resonators (matrix vibrations, oscillating charges, etc.) and leads to the following permittivity function:

$$\varepsilon(\omega) = \tilde{n}^2(\omega) = \varepsilon_\infty + \frac{\omega_p^2}{\omega^2 + j\omega\gamma_p} + \sum_{k=1}^{k_{max}} \frac{\Delta\varepsilon_k \omega_{0,k}^2}{\omega_{0,k}^2 - \omega^2 + j\omega\gamma_k} \quad (6)$$

where $\varepsilon_\infty$ is the dielectric permittivity at high frequency compared to the range of interest, $\omega_p$ is the plasma frequency, $\gamma_p$ is the damping rate $k_{max}$ is the number of considered oscillators, $\omega_{0k}$, $\gamma_k$ and $\Delta\varepsilon_k$ are the resonant angular frequency, the damping rate (line width) and the strength (maximum, expressed in permittivity units) of the $k^{th}$ oscillator, respectively.

The term $$\frac{\omega_p^2}{\omega^2 + j\omega\gamma_p}$$

is the Drude term, due to the presence of free carriers.

Formula (6) is introduced in formula (1) of $\tilde{T}(\omega)$, the model $\tilde{E}_{model}\{pi\}(\omega)$ being defined by formula (5).

Thus in the case of a single uniform layer without free carriers (Drude term equal to 0), the propagation will be modeled through the Fresnel coefficients and the multiple Lorentz oscillator model using a set of 3×k+1 physical parameters pi.

The optimization algorithm will thus deliver a set of 3 values of parameters $p1k_{opt}$, $p2k_{opt}$, $p3k_{opt}$ for each spectral line k, plus a value of $\varepsilon_\infty$, minimizing the object function.

Another model of $\tilde{s}(\omega)$ and $\overline{Fp}(\omega)$ for meta-surfaces is also described in the Peretti publication, called Time-Domain Coupled-Mode Theory (TDCMT).

The method described above proposes to directly model the temporal trace of the wave using the aforementioned harmonic oscillator model and to adjust the parameters of this oscillator (natural frequency, duration of damping and coupling to the electromagnetic wave) so that the model matches the sample time trace. To do so an optimization algorithm is implemented on the frequency domain thanks to Parceval theorem.

The method described in the Peretti publication has various advantages: (i) A precise measurement of the thickness of the sample is not needed. In fact, obtaining a precise sample thickness for materials such as carbohydrates or semiconductor wafers at sub-micrometer precision is challenging. Therefore, avoiding this step is a real improvement. (ii) The refractive index modelling problem is analyzed as a whole, and thus a small number of parameters for the fit is needed compared to the usual two values per frequency, the method is much less sensitive to the noise. This enables reaching very high precision on the refractive index. (iii) Since the residual fit error is in amplitude units, one can clearly make interpretations of this error that lead to better understanding of experiments and possible oversights of the model implemented. (iv) Since the fit is performed in the time domain (with optimization performed in the frequency domain) the phase is not lost in the presence of strong absorption, and an additional step is not needed (v) Finally, it allows precise, reliable and consistent retrieval of material parameters using the Drude-Lorentz model, but also those of metamaterials.

Similarly to all classical methods, the method described in the Peretti publication has also some drawbacks. The main one is the resolution, which is limited by the value of maximum time delay tmax.

In fact thanks to Parceval theorem the optimization is performed in the frequency domain. The calculation of the Discrete Fourier transforms $\tilde{E}_s(\omega)$ and $\tilde{E}_{ref}(\omega)$ (by a FFT algorithm) performed on the time window tmax has a direct impact on the spectral resolution (see below), meaning the ability to measure the width of a spectral line or to distinguish two close spectral lines.

The spectral resolution δf, that is to say the ability to measure a spectral line width or to discern two close lines is limited by the usual so-called Fourier uncertainty limit, which corresponds to an inverse frequency of the total delay time of the delay line:

δf=1/t max

With a tmax around 1 ns (best achievable value), the spectral resolution is at best in the range of 1 GHz.

This spectral limitation in 1/tmax comes directly from the DFT calculation.

Standard Fourier transform of a function f:

$$\hat{f}(v) = \int_{-\infty}^{+\infty} f(t)e^{-2i\pi vt} dt$$

For a function f constant on intervals [n, n+1] the Discrete Fourier transform is $$\hat{f}(v) = \sum_{n \in \mathbb{Z}} f(n)e^{-2i\pi vn}$$

For a function f periodic, taking N discrete values y1 to yN on the period, the DFT is given by the formula:

$$\forall k \in \mathbb{Z} \quad \hat{f}(k) = \hat{f}_k = \sum_{n=0}^{N-1} f(n)e^{-2i\pi kn/N}$$

Since time and frequency are two conjugated magnitudes, the spectral resolution of a DFT is limited by the Heisenberg Fourier criteria. The DFT has a Fourier transform limited resolution δf, concretely:

$$\delta f = \frac{1}{t\max} \quad (7)$$

In fact, because the DFT calculation takes the periodicity exactly equal to tmax, the information corresponding to the instant just after tmax is considered equal to the information corresponding to the instant just after 0. This is the well-known spectral aliasing. For example publication Xu, J., Yuan, T., Mickan, S., & Zhang, X. C. (2003), "Limit of spectral resolution in terahertz time-domain spectroscopy", Chinese Physics Letters, 20(8), 1266, explains that the detection of the electromagnetic pulse limited in time to tmax leads to a frequency limitation of the resolution of equation (7), with the hypothesis of a SNR (Signal to Noise Ratio) greater than 1.

It is thus needed for a new method for determination of physical parameters of a sample from the measurement of the electromagnetic field emerging from the sample performed TDS technology overcoming the spectral limitation explained above, and thus having an improved spectral resolution.

SUMMARY OF THE INVENTION

According to a first aspect there is provided a method for determining a set of physical parameters of a sample, comprising the steps of:
A Retrieving a measured sample temporal trace Es(t),
the measured sample temporal trace Es(t) having been obtained by Time Domain Spectroscopy, by illuminating a sample by an excitation beam periodically emitting electromagnetic pulses with a period T and presenting a comb frequencies, and detecting an electromagnetic field coming from the sample as a function of time by a coherent detection, a time duration on which the sample temporal trace is measured being tmax, with tmax<T,
B retrieving a measured reference temporal trace Eref(t), the measured reference temporal trace Eref(t) having been obtained by illumination and detection in the same conditions than in step A but without the presence of the sample,
C determining an widened reference temporal trace, called Eref0(t), extending on the period T and obtained by affecting a zero value to instants for which no measurement have been performed, and determining a discrete Fourier transform $\tilde{E}_{ref0}(\omega)$ of the widened reference temporal trace calculated on a time window equal to T,
D determining a modeling of an impulse response of the sample in the frequency domain, depending on the set of physical parameters, called sample frequency model $\tilde{E}_{model}\{pi\}(\omega)$, from the Fourier Transform of the widened reference temporal trace $\tilde{E}_{ref0}(\omega)$ and a physical behavior model of the sample,
E applying an optimization algorithm on the set of physical parameters comprising the sub steps of:
E1 initializing physical parameters,
realizing iteratively the sub steps of:
E2 calculating an inverse discrete Fourier transform of the sample frequency model $\tilde{E}_{model}\{pi\}(\omega)$, called estimated sample temporal trace $E_{est}\{pi\}(t)$,
E3 calculating an error function from the difference between the measured sample temporal trace Es(t) and the estimated temporal trace Eest(t),
until obtaining a set of values of physical parameters minimizing said error function.

According to a development of the first aspect the excitation beam is in the THz domain, having a frequency comprised between 100 GHz to 30 THz.

According to a further development of the first aspect the maximum time delay tmax is chosen in order to include more than 95% of the energy of the measured reference temporal trace.

According to a further development of the first the sample frequency model $\tilde{E}_{model}\{pi\}(\omega)$ consists in the multiplication of the Fourier Transform Eref0(ω) by a transfer function T(ω) characterizing the sample behavior.

Preferably the transfer function T(ω) depends on a complex refractive index n(ω).

According to a further development of the first aspect the square of the complex refractive index called permittivity ε(ω) follows a Drude-Lorentz model for each spectral line, a spectral line being characterized by a set of three parameters, an amplitude, a width called damping rate, and a central frequency.

According to a further development of the first aspect the error function is defined as:

$$\varepsilon_{er}\{p_i\} = \sum_{t=0}^{t=t_{max}} (E_{est}\{p_i\}(t) - E_s(t))^2$$

According to a second aspect there is provided a characterization device for characterizing a sample, said device comprising:
a memory storing a measured sample temporal trace Es(t) and a measured reference temporal trace Eref(t),
the measured sample temporal trace Es(t) having been obtained by Time Domain Spectroscopy, by illuminating the sample by an excitation beam periodically emitting electromagnetic pulses with a period T and presenting a comb frequencies, and detecting an electromagnetic field coming from the sample as a function of time by a coherent detection, a time duration on which the sample temporal trace is measured being tmax, with tmax<T,
the measured reference temporal trace Eref(t) having been obtained by illumination and detection in the same conditions than for measured sample temporal trace Es(t) but without the presence of the sample,
a processing unit configured to:
determine an widened reference temporal trace, called Eref0(t), extending on the period T and obtained by affecting a zero value to instants for which no measurement have been performed, and determine a discrete Fourier transform $\tilde{E}_{ref0}(\omega)$ of the widened reference temporal trace calculated on a time window equal to T,
determine a modeling of an impulse response of the sample in the frequency domain, depending on a set of physical parameters, called sample frequency model $\tilde{E}_{model}\{pi\}(\omega)$, from the Fourier Transform Eref0(ω) of the widened reference temporal trace and a physical behavior model of the sample, apply an optimization algorithm on the physical parameters comprising the steps of:
  initializing physical parameters
  realizing iteratively the sub steps of:
    calculating an inverse discrete Fourier transform of the sample frequency $\tilde{E}_{model}\{pi\}(\omega)$, called estimated sample temporal trace $E_{est}\{pi\}(t)$,
    calculating an error function from the difference between the measured sample temporal trace Es(t) and the estimated temporal trace Eest(t),
  until obtaining a set of values of physical parameters minimizing said error function.

According to a third aspect there is provided a spectrophotometer comprising:
  a characterization device according to the second aspect of the invention,
  a measuring device comprising:
    a source configured to illuminate a sample by the excitation beam,
    a detector configured to detect the measured sample temporal trace Es(t) and the measured reference temporal trace Eref(t).

BRIEF DESCRIPTION OF THE DRAWINGS

Embodiments of the present invention, and further objectives of advantages thereof, are described in details below with reference to the attached figures, wherein:

FIG. 9a (bottom) shows temporal signal with a scale of tmax and frequency signals obtained with a time window equal to tmax, and FIG. 9b (top) shows temporal signal with a scale of various T and frequency signals obtained with a time window equal to T.

DETAILED DESCRIPTION OF THE INVENTION

The inventors have developed a detailed analysis of the TDS experiment, with the initial finding that the DFT is always performed, in the state of the art methods, on the time window tmax. The consequence, as explained above, is that it is assumed that the periodicity of the light pulse of the excitation beam EB is equal to tmax.

This assumption is false in real experimental conditions. Typically the period T between two pulses is greater than tmax. For lasers presently available, T is in the range of s to ns (corresponding to a repetition rate of around GHZ to Hz), that is to say that tmax is typically below 20% of T. The repetition rate of commercially available lasers cannot be modified easily and lasers with very high repetition rate, that is to say with T smaller than 10 ns, are very expensive and difficult to handle.

Thus in a certain way the calculation of the DFT as performed in the state of the art betrays the experience. The main consequence is that the spectral limitation equal to 1/tmax.

Figure 1:
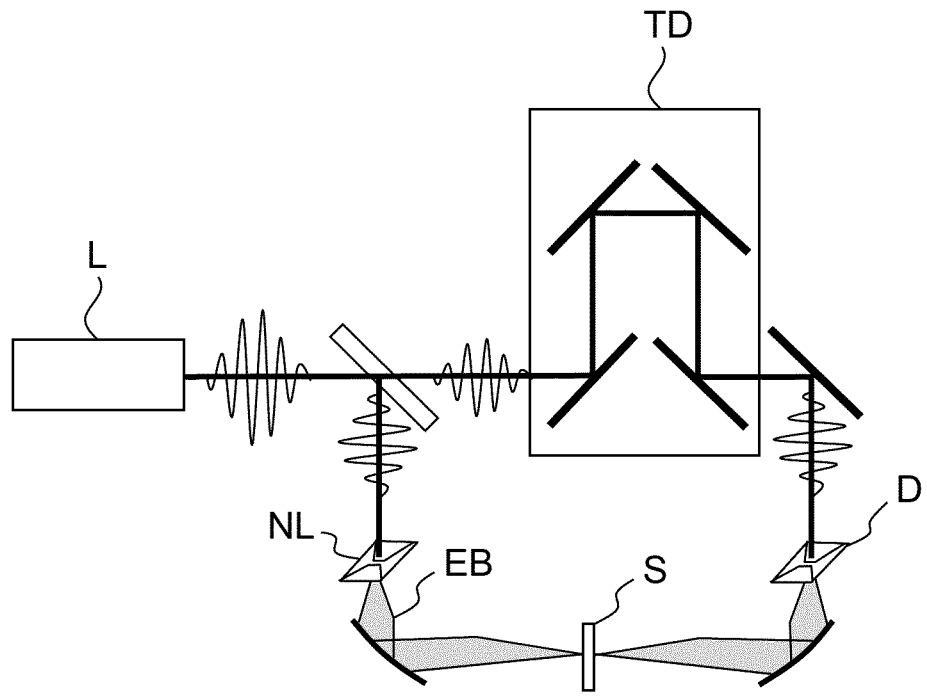
FIG. 1 illustrates the principle of THz Time Domain Spectroscopy.
Figure 2:
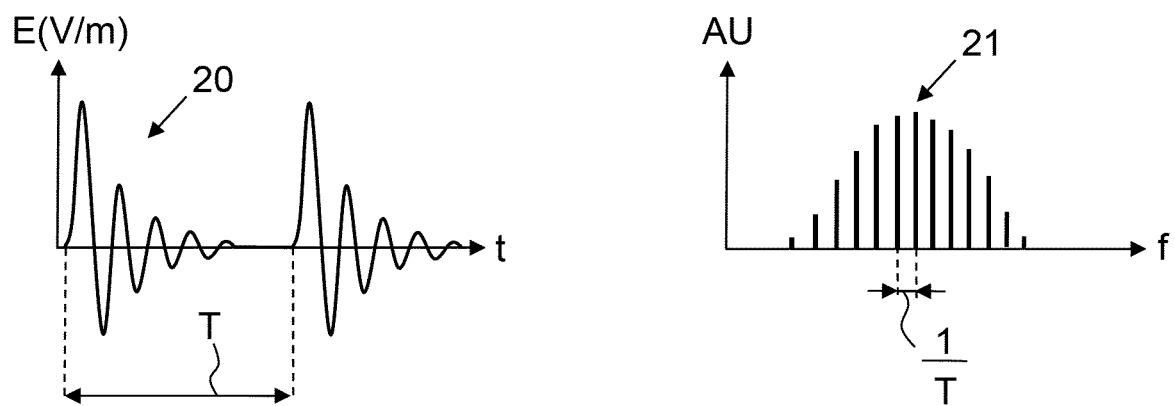
FIG. 2 illustrates the time (left) and frequency (right) behavior of the excitation beam illuminating the sample.
Figure 3:
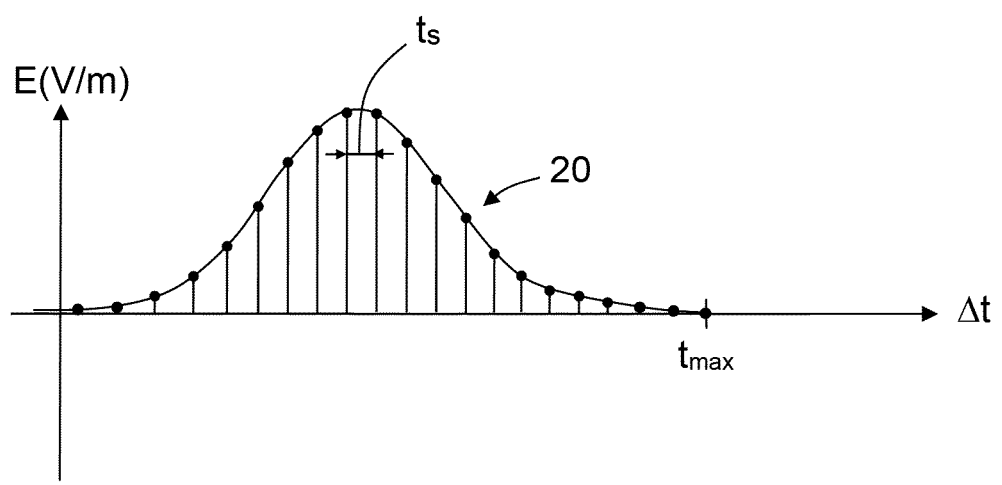
FIG. 3 illustrates time sampling of electromagnetic pulse.
Figure 4:
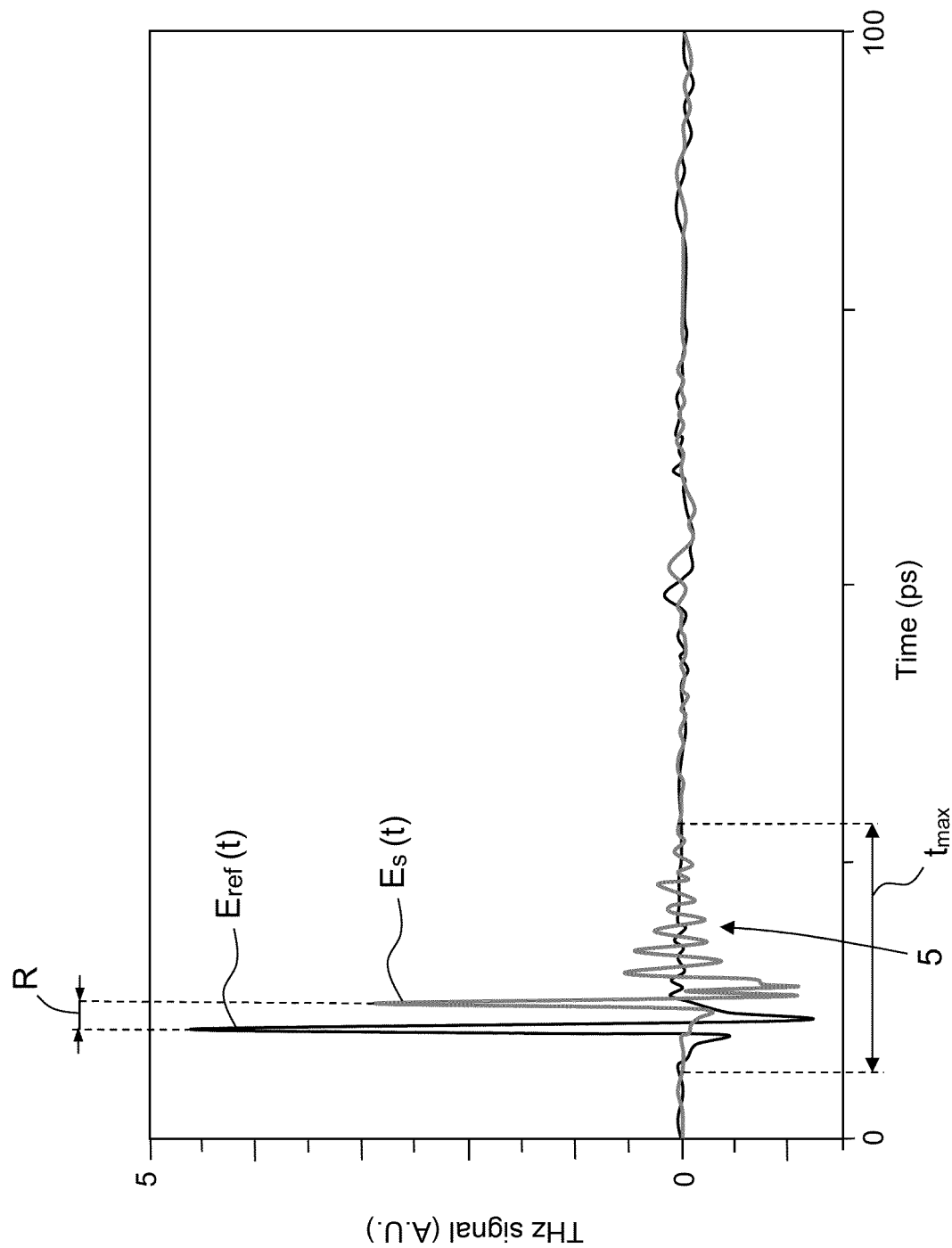
FIG. 4 shows an example of the measured temporal trace of the sample Es(t) and the reference temporal trace Eref(t) as a function of time.
Figure 5:
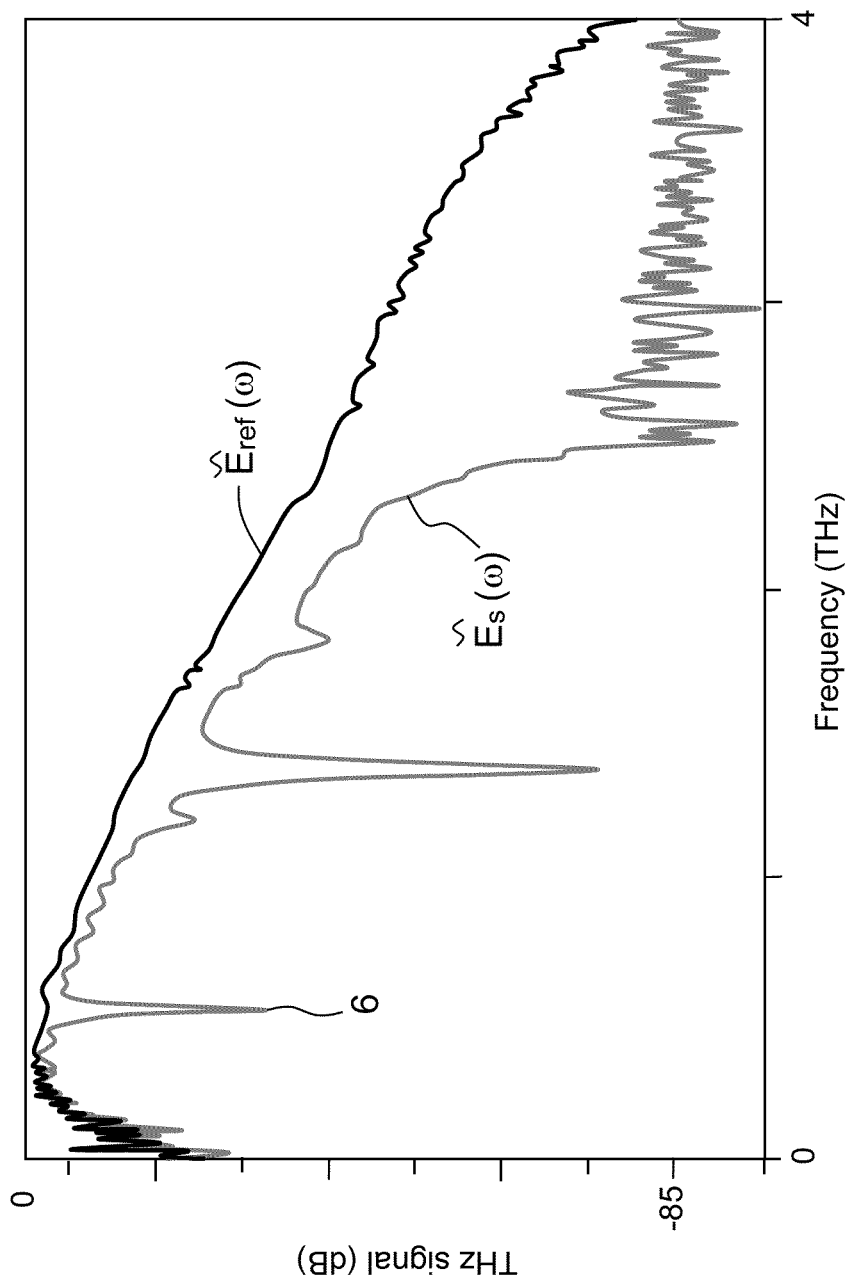
FIG. 5 shows the Discrete Fourier Transform $\tilde{E}_{ref}(\omega)$ and $\tilde{E}_s(\omega)$ on a time window equal to tmax of both temporal traces Es(t) and Eref(t).
Figure 6:
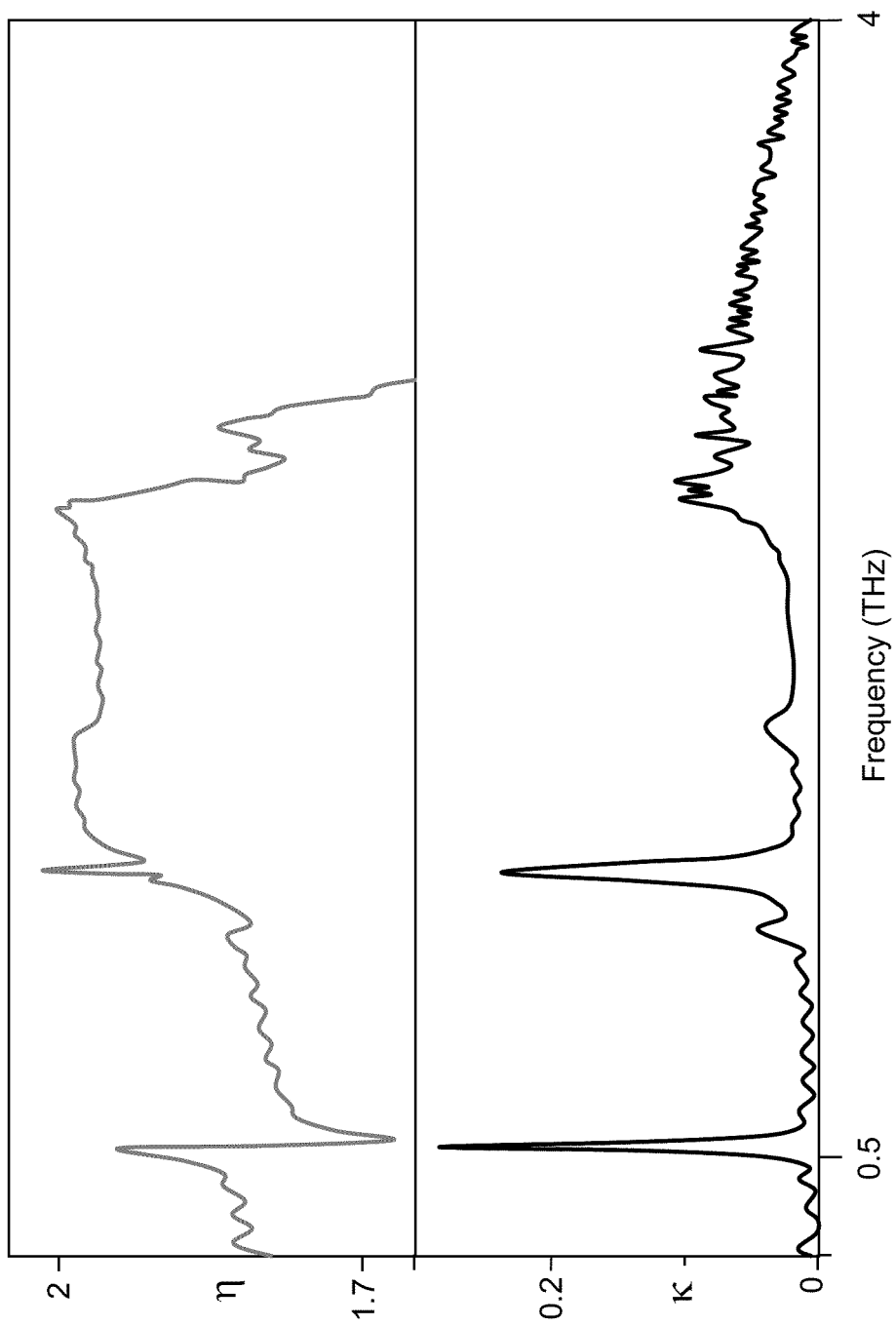
FIG. 6 shows the real part $\tilde{\eta}(\omega)$ and the imaginary part $\tilde{k}(\omega)$ of the refractive index minimizing an error function.
Figure 7:
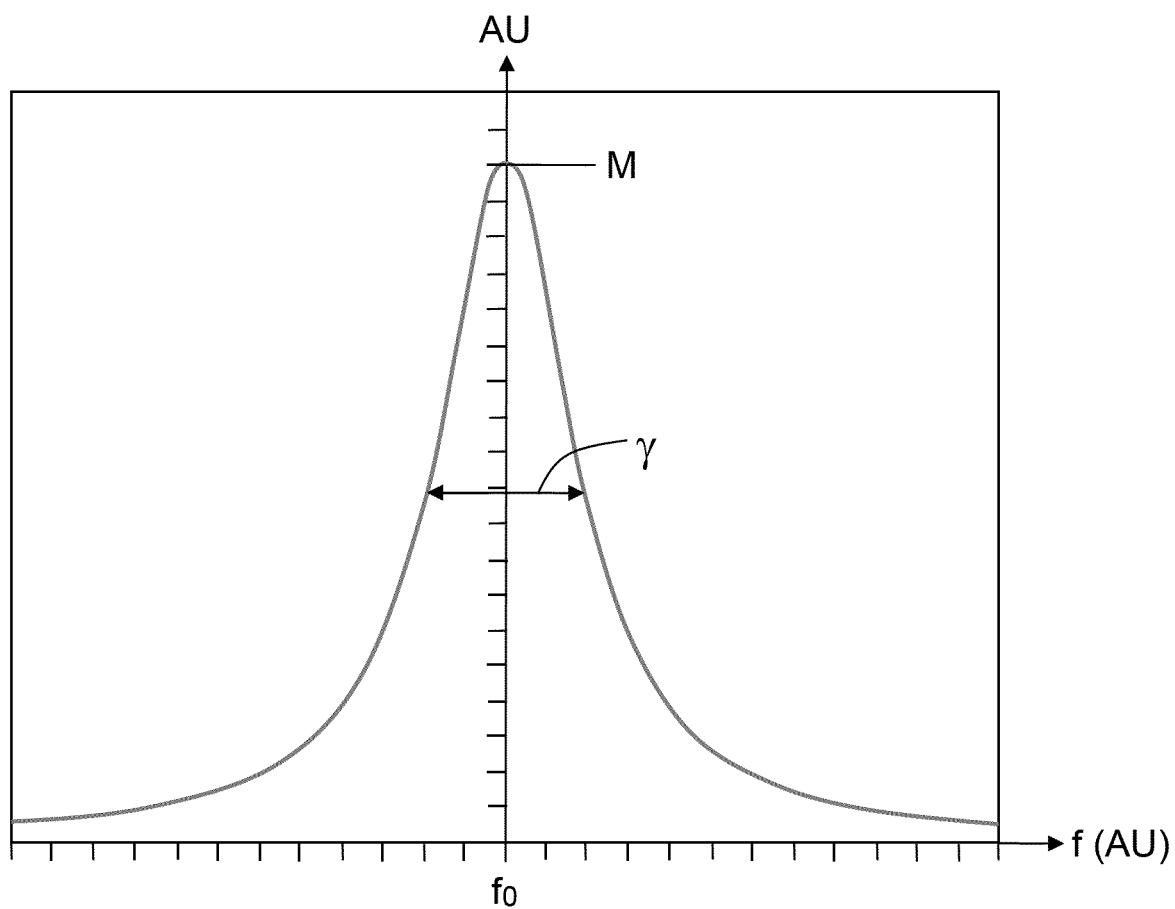
FIG. 7 illustrates a Lorentz curve.
Figure 8:
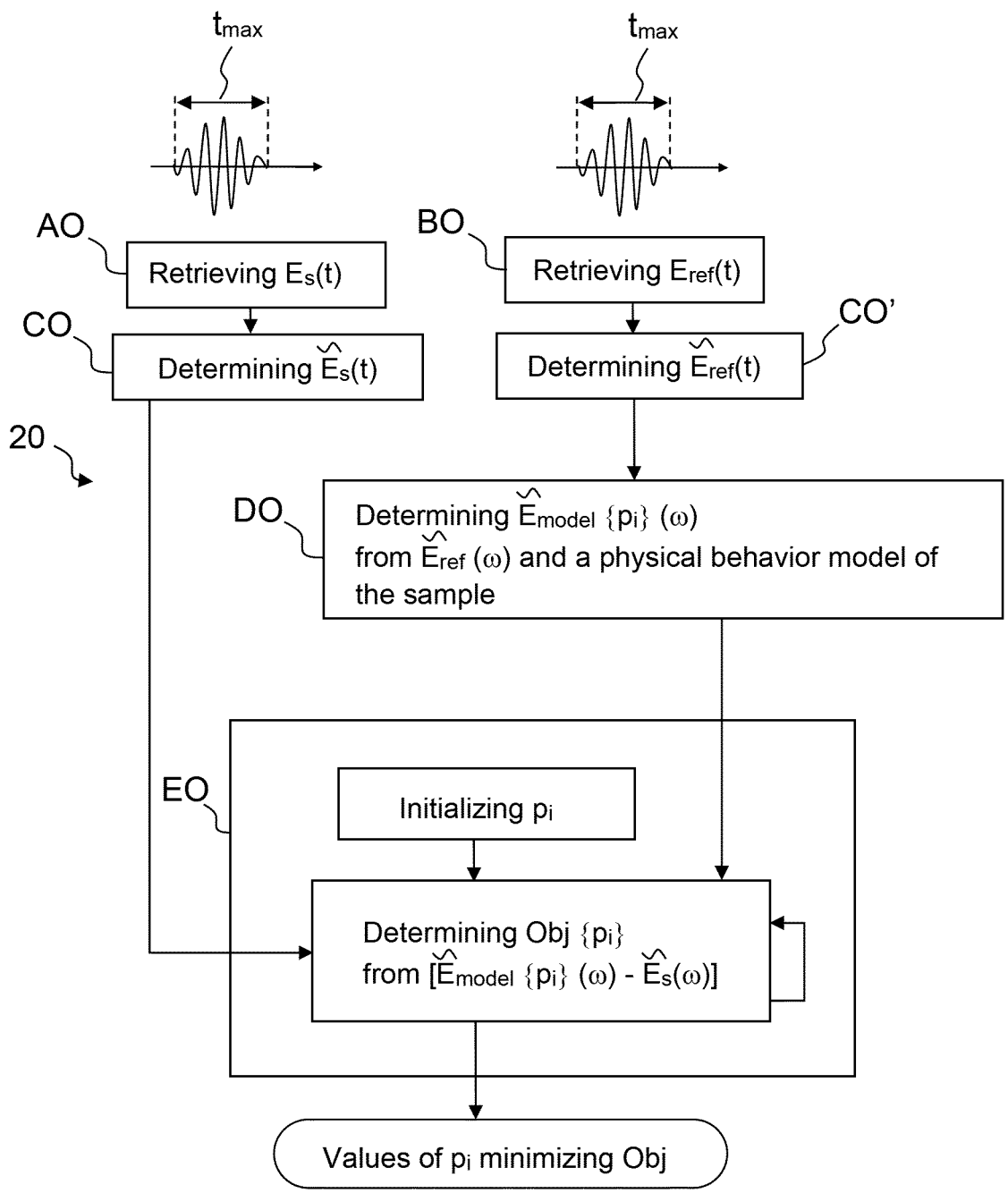
FIG. 8 illustrated a method as described in prior art.
Figure 9:
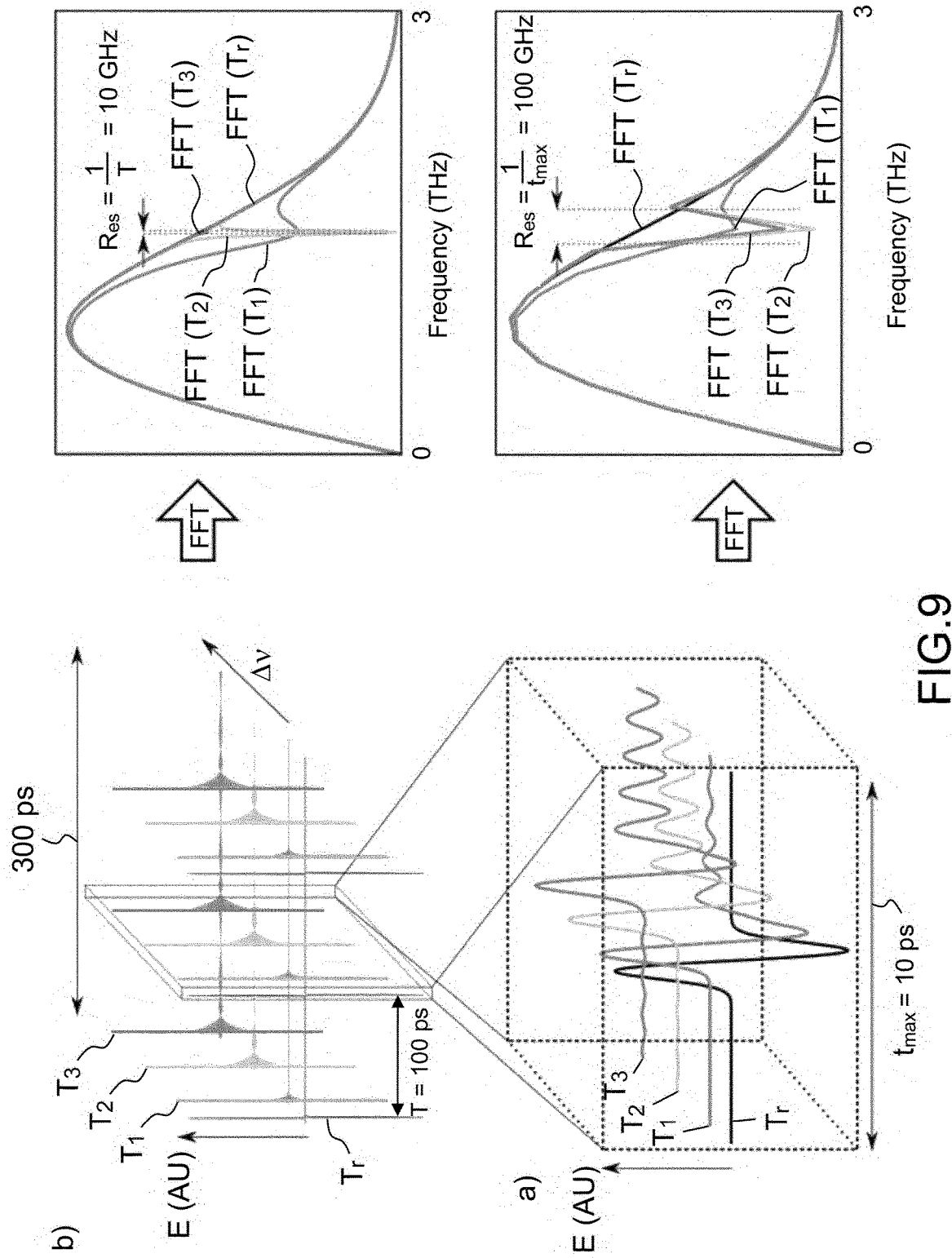
FIG. 9 illustrates the reference and sample signals in the temporal domain (left side) and the spectral domain (right side) obtained by a FFT of the temporal signals.

An improved resolution could be obtained if the measurement was performed on the full period T as illustrated in FIG. 9. The left side shows signals in the temporal domain and the right side the curves in the spectral domain obtained by a FFT of the temporal signals.

Signal Tr is an example of simulated reference temporal trace Eref(t), and signals T1 to T3 are examples of simulated sample temporal traces Es(t), obtained with a sample having an absorption line presenting a decreasing frequency width Δv from T1 to T3, (that is to say an extension of the trace in the temporal domain from T1 to T3).

In the lower part of the drawing a) the signals are only available on a time tmax of 10 ps and in the upper part of the drawing b) the signals are available on a time duration (300 ps) greater than the period T (equal to 100 ps).

The spectrum of the lower part a) is calculated by FFT using a time window equal to tmax. It can be seen that the resolution Res in the frequency domain is limited and that the decreasing of Δv cannot be observed: the spectral resolution is limited to 1/tmax=100 GHz.

The spectrum of the upper part b) is calculated by FFT using a time window equal to T. It can be seen that the resolution in the frequency domain permits the observation of the decreasing of Δv: the spectral resolution is 1/T=10 GHz.

The lower part of the figure illustrates the limitation of a real experiment where the measurement is performed on a duration tmax smaller that T. Concretely, in the experiment the resolution is reduced by a factor equal to the ratio of times T/tmax, here 10. This spectral limitation is a huge drawback for characterizing narrow lines of gases.

Figure 10:
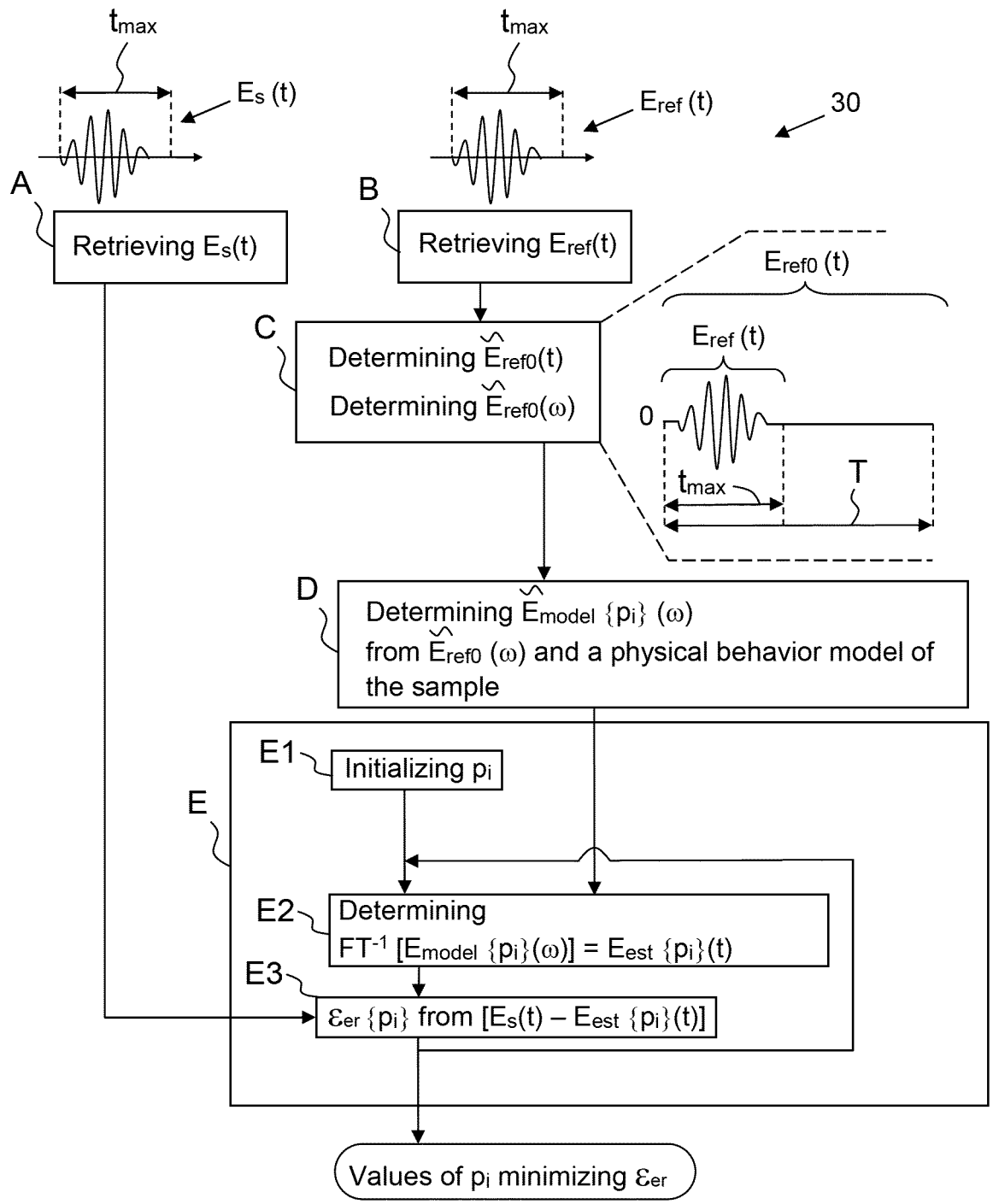
FIG. 10 illustrates the method according to the invention.

The method 30 for determining a set of physical parameters of a sample according to the invention is illustrated in FIG. 10. The method 30 comprises a step A of retrieving a measured sample temporal trace Es(t) and a step B of retrieving a measured reference temporal trace Eref(t). Preferably both measured temporal traces, the sample one and the reference one (obtained by illumination and detection in the same conditions than in step A but without the presence of the sample), are obtained by a classical TDS device as explained previously. The measured sample temporal trace Es(t) have been obtained by illuminating a sample S to characterize by an excitation beam EB, periodically emitting electromagnetic pulses (which may be called light pulses when the wavelength is smaller than 10 μm) with a period T and presenting a frequency comb, and by detecting an electromagnetic field coming from the sample (transmission or reflection) as a function of time by a coherent detection. Typically the coherent detection includes a delay line or is based on the Hassops experiment (dual frequency comb).

Preferably the excitation beam EB is in the THz domain, having a frequency comprised between 0.1 THz to 30 THz, but the method 30 as claimed can be extrapolated to higher frequencies (IR, visible), when the illumination and detection apparatus will become available.

The time duration on which both temporal traces are measured is called tmax, with tmax less than T.

Steps A and B of the claimed method 30 are identical to steps A0 and B0 of method 20 of the Peretti publication previously described.

In a step C a widened (also called padded) reference temporal trace, called Eref0(t), is determined. Eref0(t) extends on the period T and is obtained by affecting a zero value to instants for which no measurement have been performed, that is to say instants after t=tmax and until t=T. Any arbitrary value could be affected to those instants, but zero is the best value to express the fact that little or no pulse energy can be found in the interval [tmax, T]. For this reason preferably the maximum time delay tmax is chosen large enough to include more than 95% (preferably 99%) of the energy of the measured reference temporal trace (the precision of the method increases accordingly with the percentage value). This way of completing unknown values by 0 before computing data is known as "0 padding".

Also in step C the discrete Fourier transform $\tilde{E}_{ref}0(\omega)$ of the widened reference temporal trace Eref0(t) is determined, the calculation being performed on a time window equal to T, which is possible because Eref0(t) spans the entire period T.

$$\tilde{E}_{ref0}(\omega) = \sum_{t=0}^{T} \left[E_{ref0}(t) \times e^{i\omega t}\right] \quad (8)$$

Thus the DFT calculating $\tilde{E}_{ref}0(\omega)$ is different from the DFT of step C0' of method 20 calculating $\tilde{E}_{ref}(\omega)$, which is performed on temporal window tmax.

Then in a step D a modeling of an impulse response of the sample in the frequency domain, called sample frequency model $\tilde{E}_{model}\{pi\}(\omega)$, is determined. The sample frequency model depends on a set of physical parameters pi (i index of the parameter), and is determined from the Fourier Transform $\tilde{E}_{ref0}(\omega)$ of the widened reference temporal trace and a physical behavior model of the sample. The modeling of step D is identical to modeling of step D0 of method 20, with the difference that the modeling of the method 30 as claimed is defined from $\tilde{E}_{ref0}(\omega)$, which is different from $\tilde{E}_{ref}(\omega)$.

Preferably the sample frequency model $\tilde{E}_{model}\{pi\}(\omega)$ consists in the multiplication of the Fourier Transform $\tilde{E}_{ref0}(\omega)$ by a transfer function $T(\omega)$ characterizing the sample behavior:

$$\tilde{E}_{model}\{pi\}(\omega) = \tilde{E}_{ref0}(\omega) \times \tilde{T}(\omega) \quad (9)$$

Preferably the transfer function $T(\omega)$ depends on a complex refractive index $n(\omega)$, as previously explained (see equation (1)).

The choice of the model depends on the sample but is constrained, as the spectroscopic line shape is imposed by the laws of physics.

According to one embodiment the square of the complex refractive index, called permittivity $\varepsilon(\omega)$, follows (but is not limited to) a Drude-Lorentz model for each spectral line, that is to say that each spectral line follows a Lorentz distribution shape. In this case a spectral line k is characterized by a set of three parameters: an amplitude $p1=\Delta\varepsilon_k$ (in dielectric unit), a width called damping rate $p2=\gamma_k$, and the central (resonant) frequency $p3=\omega_{0k}$, as described in formula (6). This model is suited for modeling spectral lines of gases.

In a step E an optimization algorithm is applied on the set of physical parameters pi. First in sub step E1 physical parameters pi are initialized, then the following sub steps E2 and E3 are realized iteratively:

In E2 an inverse discrete Fourier transform of the sample frequency model $\tilde{E}_{model}\{pi\}(\omega)$ is calculated. This inverse discrete Fourier transform is called estimated sample temporal trace $\tilde{E}_{est}\{pi\}(t)$ and is determined as follows:

$$E_{est}(t) = \sum_{\omega=-\pi/t_s}^{\pi/t_s} \left[\tilde{E}_{est}(\omega) \times e^{i\omega t}\right]$$

ts being the sample time.

Here the real period of the experiment, that is to say the repetition rate T of the laser source, is used for the calculation. As such, model and experiments follow the same periodicity preventing any DFT-folding (aliasing) artifact but reproducing the real ones. Consequently, a line narrower than the Fourier-Heisenberg limitation, because of the additional information introduced by the modeling, will give rise to a time signal going over the right edge of the time window and coming back on the beginning of it on the left edge. Still this signal can be fitted and thus give rise to resolution better than the Fourier Heisenberg criteria.

Then in E3 an error function $\varepsilon_{er}\{pi\}$ is calculated, from the difference between the measured sample temporal trace Es(t) and the estimated temporal trace Eest(t), that is to say that $\varepsilon_{er}\{pi\}$ depends on [Es(t)−Eest(t)] according to a function f, where f is a function defining a topological distance:

$$\varepsilon_{er}\{p_i\} = \sum_{k=0}^{t=t_{max}} f(E_{est}\{p_i\}(t) - E_s(t)) \quad (10)$$

The iteration goes on until obtaining a set of values of parameters pi minimizing the error function. For example the iteration stops when the error function becomes less than a predetermined threshold or stop to evolve.

The result of the finalized optimization is a set of values of parameters pi.

For gas spectral lines following the Lorentz model, a set of 3 values of parameters per line ($\Delta\varepsilon_k, \gamma_k, \omega_{0k}$) are delivered: $p3=\omega_{0k}$ permits gas identification, $p1=\Delta\varepsilon_k$ is related to gas pressure and $p2=\gamma_k$ is related to gas temperature.

It is important to note that the optimization is performed on values of t between 0 to tmax. The recorded data Es(t) is only available over tmax (the measurement on the full time frame T is not possible as explained previously). As it not possible to add information which does not exist on Es(t), only a fraction of the time frame of the model can be compared with the recorded data Es(t). Typically around 10% (ratio tmax/T) of the available calculated data of Eest(t) are taken for the error calculation.

Consequently, because the hypothesis are not met, Parseval theorem cannot be used to compare the curves and calculate the error in the frequency domain, as previously performed in method 20 of the Peretti publication.

Because Parceval theorem cannot be used, a fast Fourier transform has to be performed at each iteration in step E2 to get modeled data in the time domain, and subsequently calculate the error (step E3).

The error function choice depends of the type of optimization. An example of the error function is the root mean square difference:

$$\varepsilon_{er}\{p_i\} = \sum_{k=0}^{t=t_{max}} (E_{est}\{p_i\}(t) - E_s(t))^2 \qquad (11)$$

As an example, the augmented Lagrangian particle swarm optimizer is used to perform the constrained optimization.

The sample behavior, that is to say the formula followed by $\tilde{E}_{model}\{pi\}(\omega)$ or by $T(\omega)$ if applicable, is known. This "a priori" knowledge is very important since it allows the implementation of this constrained reconstruction algorithm without losing any information, leading to a much higher resolution (super resolution) than the method 20 of the Peretti publication.

For example the knowledge given by the theoretical physics of spectral lines of gas allows saying that recorded lines follow a Lorentz distribution shape in the frequency domain, corresponding to an exponentially damped sinus in the time domain. The super-resolution relies on the fact that each damped sinus is described by only three parameters: the amplitude, the central frequency and the damping rate. One needs only few time domain points to retrieve the parameter with the limitation of having fewer oscillators than a fraction of the total number of points in the full time trace (generalized Fourier-Heisenberg uncertainty). In other words, the TDS system records a full time trace as information and often it is wanted to retrieve 3k+1 parameters from it. Performing the calculation in the temporal domain means that instead of searching for a information each δf (δf being the frequency step of the Fourier transform) in the frequency domain, few modes (k oscillators) are searched and thus much less information, also called sparse information, is searched. With this constraint, the resolutions will only be limited by the signal-to-noise ratio and the computational methods to optimize the fit, similarly as in super resolution microscopy.

The method 30 as claimed determining sample parameters makes it possible to fully exploit the quantity of information present in a TDS spectrum, by performing high resolution spectroscopy on a very wide spectrum. This allows for example to monitor an event by looking at several hundred lines of gas (of the same gas or a mixture) and therefore by measuring the relative concentrations of different components.

In order to improve the speed of the claimed method, which consumes a lot of computer time (one DFT per iteration), in one embodiment of the claimed method an harmonic inversion approaches is implemented instead of a constraint algorithm. The harmonic inversion may be used if all the requirements are met: specifically it is important to be sure that the excitation pulse is very close to a Dirac pulse, letting the system in full relaxation during a considerable ratio of the time trace.

Figure 11A:
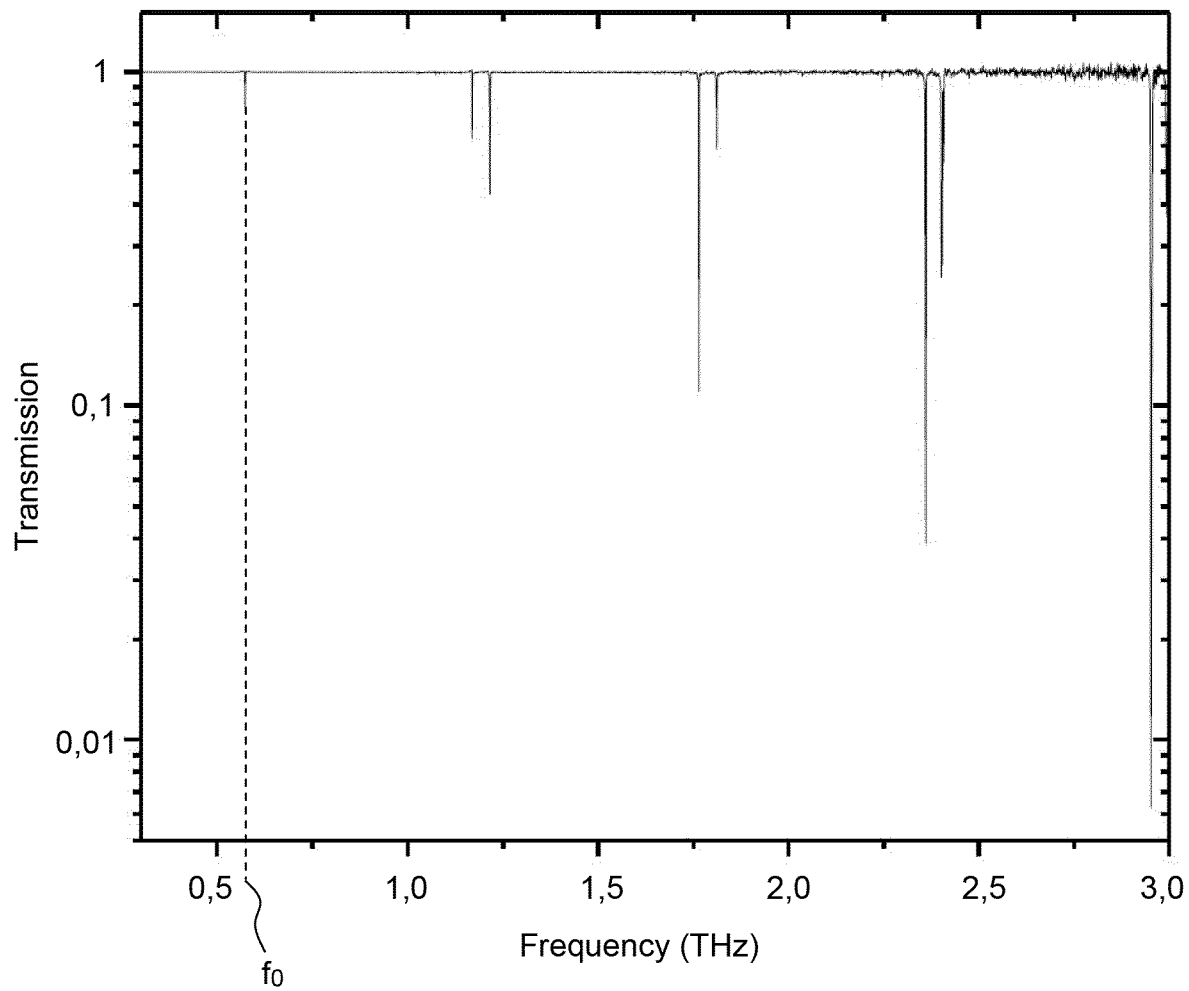
FIG. 11A shows the transmission spectrum of the sample at a pressure of 1 kPa.

In order to test the performance of the method, ammonia ($NH_3$) time trace was recorded by the mean of a commercial THz-TDS TERASMART Menlo® that is a compact, transportable all-fiber spectrometer device. It uses a femtosecond laser (90 fs pulse) with a frequency of repetition of 100 MHZ. The THz pulse duration is ~400 fs for a spectrum extending from 200 GHz to 5 THz. A Brewster angle Silicon windows gas cell, with an optical path length of 8 cm, was set in the optical path to make the measurements. The thirteen minutes long experiments was repeated for different pressure from 3 mb to 100 mb. The transmission spectrum of the sample at 1 kPa (10 mb) gives the spectrum shown on FIG. 11A. The main absorption pic is the pic at the frequency f0=0.573 THz.

Figure 11B:
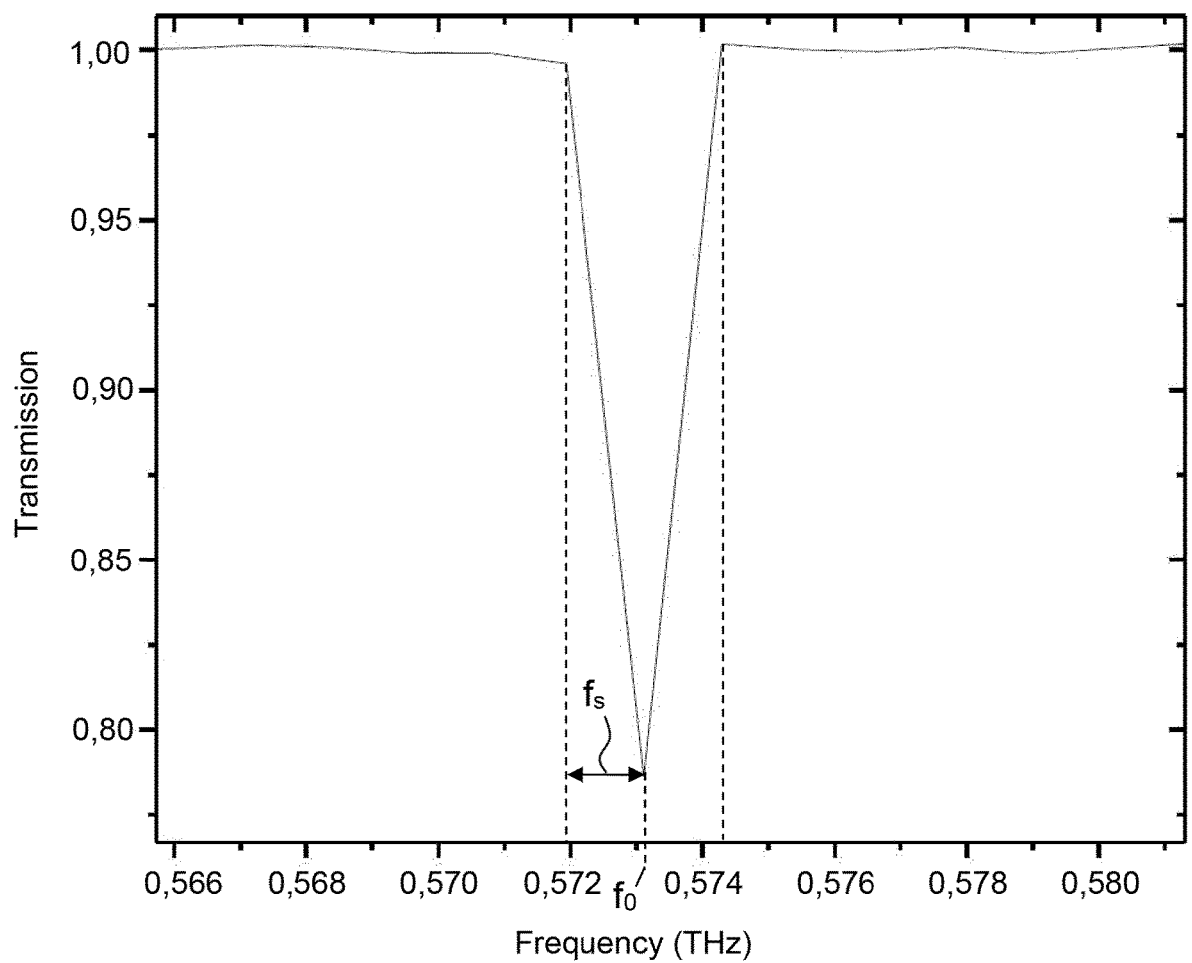
FIG. 11B illustrates a zoom of the absorption spectrum around f0=0.573 THz.

The FIG. 11B shows a zoom of the FFT on the peak around f0=0.573 THz. It can be seen that with the frequency sampling fs equal to 1.2 GHZ the pic is only visible on one point.

Figure 12:
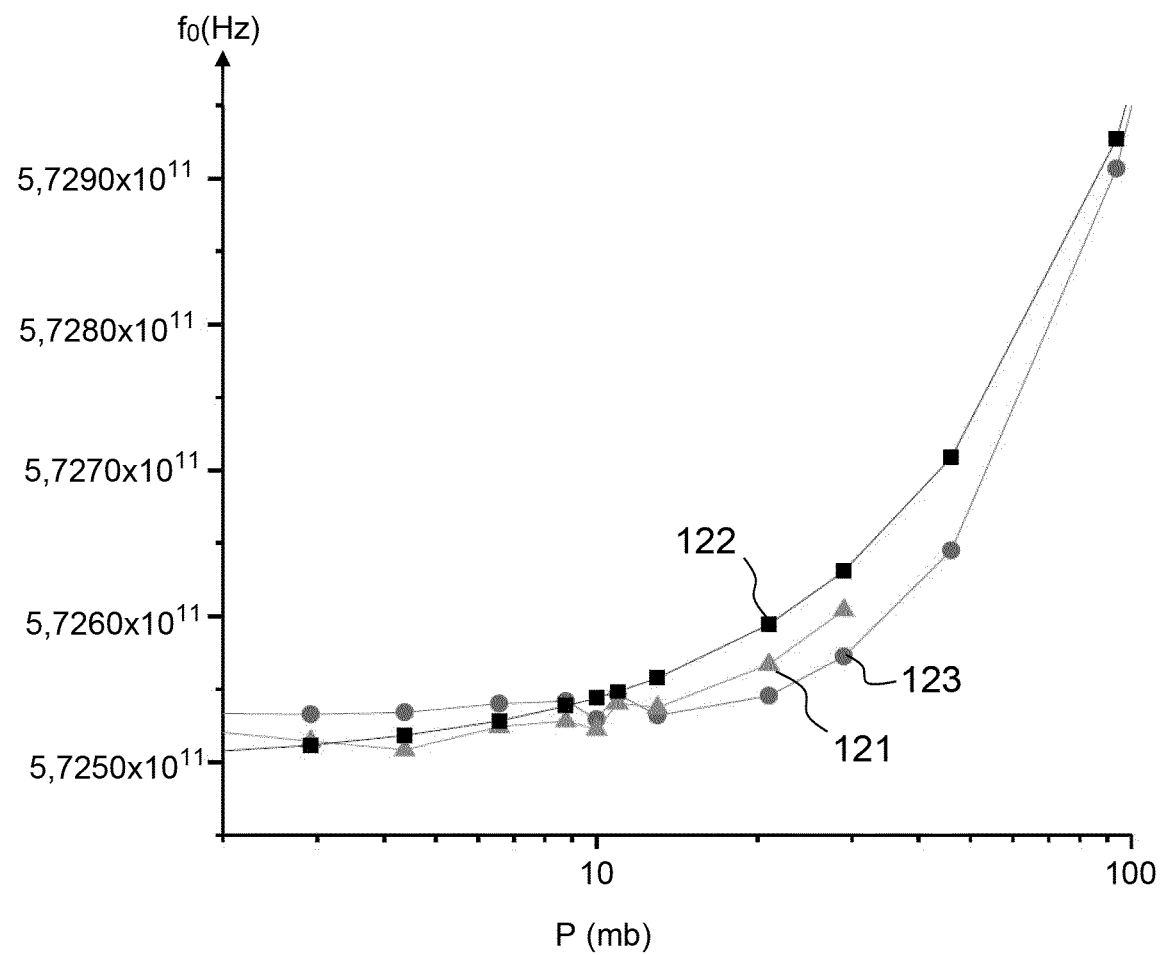
FIG. 12 illustrates comparison of the central frequency values as a function of pressure P obtained by the different methods: method according to the invention, state of the art, database.
Figure 13:
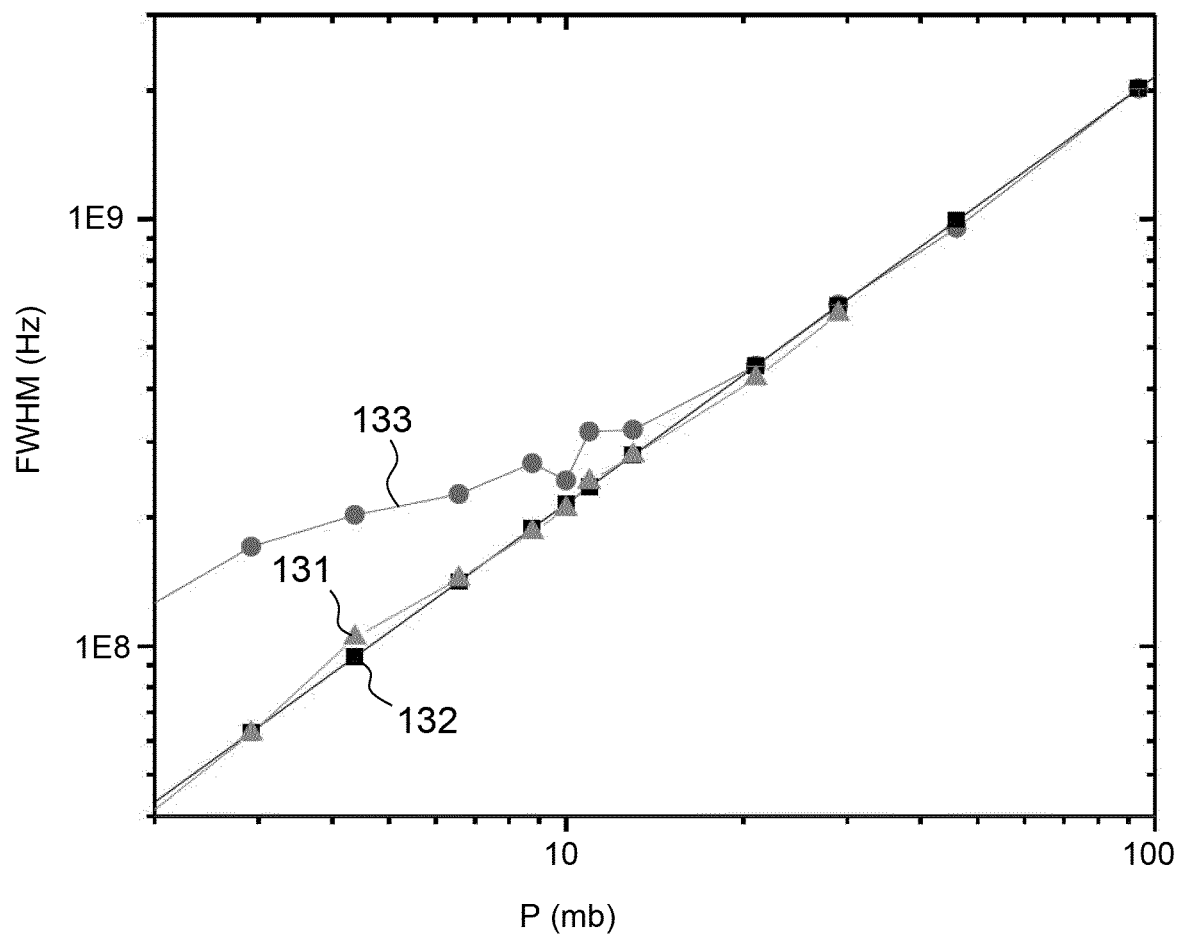
FIG. 13 illustrates the damping rate γ also (called FWHM) values as a function of pressure P obtained by different methods: method according to the invention, state of the art, database.

FIG. 12 illustrates the central frequency values f0 obtained by the method 30 as claimed as a function of pressure P (curve 121, triangles) and FIG. 13 illustrates the damping rate γ also (called FWHM) values obtained by the method 30 as claimed as a function of pressure P (curve 131, triangles).

Data of $NH_3$ extracted from database Hitran 2016 are also plotted on FIGS. 12 and 13 for comparison (respectively curves 122 and 132, squares). The values of physical parameters f0 and γ determined by method 30 fit very well the data from Hitran, for both γ and f0, thus demonstrating the very good accuracy of the claimed method.

Values of f0 and damping rate obtained with the Peretti method 20 are also plotted for comparison (respectively curves 123 and 133, full circles). It can be seen on FIG. 13 that method 20 gives good result for high values of FWHM corresponding to high pressure, but becomes much less accurate for FWHM values of pressures inferior to 10 mb, due to insufficient frequency resolution of the method 20.

Additionally to focus on the line around 530 GHz of $NH_3$, an analysis of other lines of the spectrum have been performed, and a super resolution all along the spectrum from 530 GHz to above 3 THz has been achieved. More specifically, a focus on the lines around 1250 GHz has been done. This line is in fact a doublet separated by 350 MHz (one Third of the delay line "Fourier transform" resolution limitation). Thanks to the super resolution method as claimed, the frequency of each line of this doublet has been retrieved for pressure down to few mBar with a precision better than 30 MHz. Consequently, a doublet separation bellow the resolution limit has been achieved, that is the hardest proof of super resolution.

Thanks to the high resolution of the claimed method, the TDS super resolution method 30 applied to THz pulses spreads the use of THz-TDS for gas spectroscopy especially for atmospheric or health purpose as in breath analyser, and for control of industrial environment.

Figure 14:
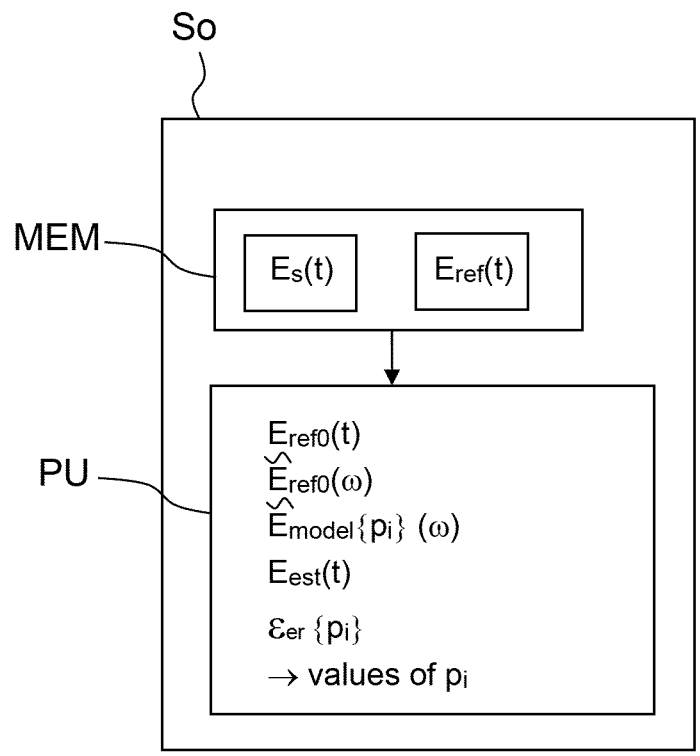
FIG. 14 illustrates a characterization device 50 for characterizing a sample according to the invention.

According to another aspect the invention relates to a characterization device 50 for characterizing a sample S illustrated on FIG. 14. The device 50 comprises a memory MEM storing a measured sample temporal trace Es(t) and a measured reference temporal trace Eref(t) as previously defined and a processing unit PU configured to:

determine an widened reference temporal trace, called Eref0(t), extending on the period T and obtained by affecting a zero value to instants for which no measurement have been performed, and determine a discrete Fourier transform $\tilde{E}_{ref}0(\omega)$ of the widened reference temporal trace calculated on a time window equal to T, determine a modeling of an impulse response of the sample in the frequency domain, depending on a set of physical parameters pi(ω), called sample frequency model $\tilde{E}_{model}\{Pi\}(\omega)$, from the Fourier Transform $\tilde{E}_{ref}0$ (ω) of the widened reference temporal trace and a physical behavior model of the sample, apply an optimization algorithm on the set of physical parameters (pi) comprising the sub steps of:
  initializing physical parameters (pi),
  realizing iteratively the sub steps of:
    calculating an inverse discrete Fourier transform of the sample frequency model $\tilde{E}_{model}\{Pi\}(\omega)$, called estimated sample temporal trace $E_{est}\{pi\}(t)$,
    calculating an error function ($\varepsilon_{er}\{pi\}$) from the difference between the measured sample temporal trace Es(t) and the estimated temporal trace Eest(t),
  until obtaining a set of values ($pi_{opt}$) of physical parameters minimizing said error function.

Figure 15:
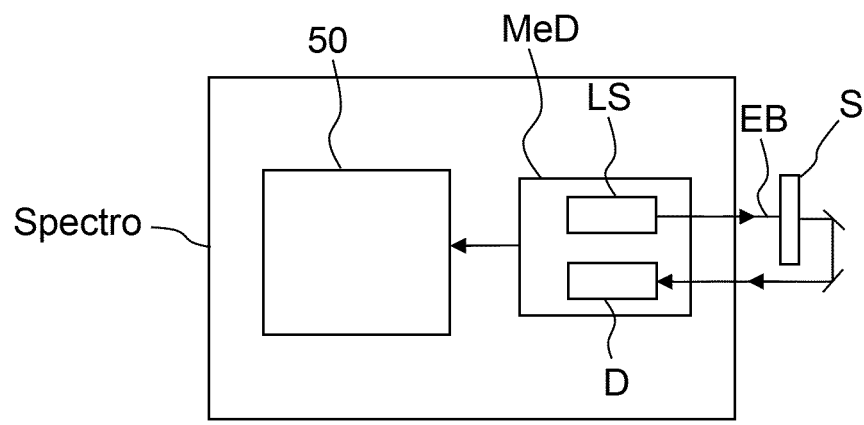
FIG. 15 illustrates a spectrometer according to the invention.

According to another aspect the invention relates to a spectrometer Spectro as illustrated on FIG. 15 comprising i) a measuring device MeD comprising a light source LS configured to illuminate a sample S by the excitation beam EB and a detector D configured to detect the measured sample temporal trace Es(t) and the measured reference temporal trace Eref(t) and ii) a characterization device 50.

It will be appreciated that the foregoing embodiments are merely non limiting examples. In particular, the measuring device MeD and the characterization device 50 may be located in different elements and used together in any combination.

Figure 16:
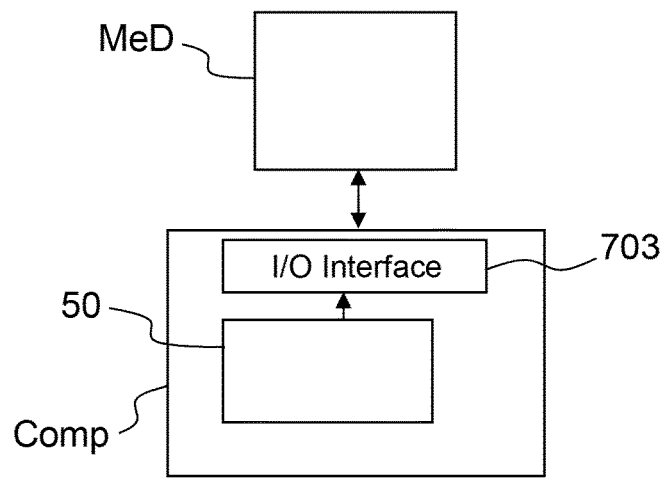
FIG. 16 illustrates an embodiment of the invention where the measuring device is linked to a computer I/O interface, the characterization device being located in the computer.
Figure 17:
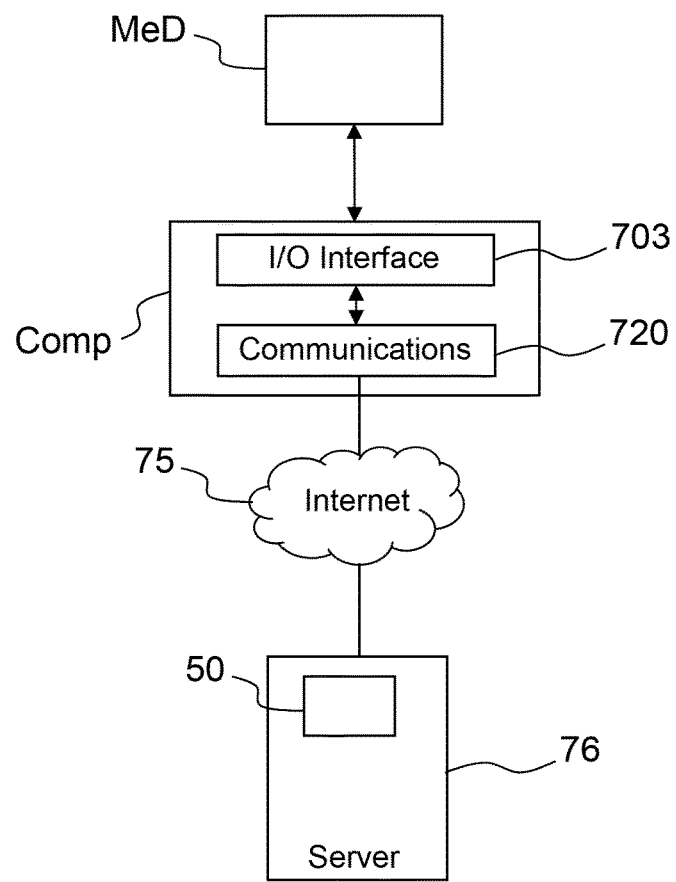
FIG. 17 illustrates another embodiment where the measuring device is linked to a computer via an I/O interface and the characterization device is located in a remote server linked via internet to the communication subsystem of the computer Comp.

In an embodiment MeD may be linked to a computer Comp via an I/O interface 703, the characterization device 50 DBP being located in the computer, as illustrated in FIG. 16. In another embodiment MeD may be linked to a computer Comp via an I/O interface 703 and characterization device 50 may be located in a remote server 76 linked via internet 75 to the communication subsystem 720 of the computer Comp, as illustrated in FIG. 17.

On another aspect, the invention relates to a computer program adapted to implement the steps of the method as claimed. On another aspect the invention relates to a computer readable medium incorporating the computer program.

The invention claimed is:

1. A method for determining a set of physical parameters of a sample, comprising the steps of:

A Retrieving a measured sample temporal trace Es(t), the measured sample temporal trace Es(t) having been obtained by Time Domain Spectroscopy, by illuminating a sample (S) by an excitation beam (EB) periodically emitting electromagnetic pulses with a period T and presenting a comb frequencies, and detecting an electromagnetic field coming from the sample as a function of time by a coherent detection, a time duration on which the sample temporal trace is measured being tmax, with tmax<T, B retrieving a measured reference temporal trace Eref(t), the measured reference temporal trace Eref(t) having been obtained by illumination and detection in the same conditions than in step A but without the presence of the sample, C determining an widened reference temporal trace, called Eref0(t), extending on the period T and obtained by affecting a zero value to instants for which no measurement have been performed, and determining a discrete Fourier transform $\tilde{E}_{ref0}(\omega)$ of the widened reference temporal trace calculated on a time window equal to T, D determining a modeling of an impulse response of the sample in the frequency domain, depending on the set of physical parameters (pi), called sample frequency model $\tilde{E}_{model}\{pi\}(\omega)$, from the Fourier Transform of the widened reference temporal trace $\tilde{E}_{ref0}(\omega)$ and a physical behavior model of the sample, E applying an optimization algorithm on the set of physical parameters (pi) comprising the sub steps of:
  E1 initializing physical parameters (pi),
  realizing iteratively the sub steps of:
    E2 calculating an inverse discrete Fourier transform of the sample frequency model $\tilde{E}_{model}\{pi\}(\omega)$, called estimated sample temporal trace $E_{est}\{pi\}(t)$,
    E3 calculating an error function ($\varepsilon_{er}\{pi\}$) from the difference between the measured sample temporal trace Es(t) and the estimated temporal trace Eest(t),
  until obtaining a set of values ($pi_{opt}$) of physical parameters minimizing said error function.

2. The method as claimed in claim 1, wherein the excitation beam (EB) is in the THz domain, having a frequency comprised between 100 GHz to 30 THz.

3. The method as claimed in claim 1, wherein the maximum time delay tmax is chosen in order to include more than 95% of the energy of the measured reference temporal trace.

4. The method as claimed in claim 1, wherein the sample frequency model $\tilde{E}_{model}\{pi\}(\omega)$ consists in the multiplication of the Fourier Transform Eref0(ω) by a transfer function T(ω) characterizing the sample behavior.

5. The method as claimed in claim 4, wherein the transfer function T(ω) depends on a complex refractive index n(ω).

6. The method as claimed in claim 5, wherein the square of the complex refractive index called permittivity ε(ω) follows a Drude-Lorentz model for each spectral line, a spectral line being characterized by a set of three parameters, an amplitude (M), a width called damping rate (γ), and a central frequency (ω0).

7. The method as claimed in claim 1, wherein the error function is defined as:

$$\varepsilon_{er}\{p_i\} = \sum_{t=0}^{t=t_{max}} (E_{est}\{p_i\}(t) - E_s(t))^2$$

8. A computer program adapted to implement the steps of claim 1.

9. A non-transitory computer readable storage medium having stored thereon a computer program according to claim 8.

10. A characterization device for characterizing a sample (S), said device comprising:
  a memory (MEM) storing a measured sample temporal trace Es(t) and a measured reference temporal trace Eref(t),
  the measured sample temporal trace Es(t) having been obtained by Time Domain Spectroscopy, by illuminating the sample (S) by an excitation beam (EB) periodically emitting electromagnetic pulses with a period T and presenting a comb frequencies, and detecting an electromagnetic field coming from the sample as a function of time by a coherent detection, a time duration on which the sample temporal trace is measured being tmax, with tmax<T, the measured reference temporal trace Eref(t) having been obtained by illumination and detection in the same conditions than for measured sample temporal trace Es(t) but without the presence of the sample, a processing unit (PU) configured to:
- determine an widened reference temporal trace, called Eref0($t$), extending on the period T and obtained by affecting a zero value to instants for which no measurement have been performed, and determine a discrete Fourier transform $\tilde{E}_{ref0}(\omega)$ of the widened reference temporal trace calculated on a time window equal to T,
- determine a modeling of an impulse response of the sample in the frequency domain, depending on a set of physical parameters (pi), called sample frequency model $\tilde{E}_{model}\{pi\}(\omega)$, from the Fourier Transform Eref0($\omega$) of the widened reference temporal trace and a physical behavior model of the sample,
- apply an optimization algorithm on the physical parameters (pi) comprising the steps of:
    initializing physical parameters
    realizing iteratively the sub steps of:
        calculating an inverse discrete Fourier transform of the sample frequency model $\tilde{E}_{model}\{pi\}(\omega)$, called estimated sample temporal trace $E_{est}\{pi\}$(t),
        calculating an error function ($\varepsilon_{er}\{pi\}$) from the difference between the measured sample temporal trace Es(t) and the estimated temporal trace Eest(t), until obtaining a set of values ($p_{opt}i$) of physical parameters minimizing said error function.

11. A spectrophotometer (Spectro) comprising:
a characterization device as claimed in claim 10;
a measuring device (MeD) comprising:
a source (LS) configured to illuminate a sample (S) by the excitation beam (EB),
a detector (D) configured to detect the measured sample temporal trace Es(t) and the measured reference temporal trace Eref(t).

* * * * *